(12) United States Patent
Bulka et al.

(10) Patent No.: US 7,792,796 B1
(45) Date of Patent: Sep. 7, 2010

(54) METHODS, SYSTEMS, AND COMPUTER PROGRAM PRODUCTS FOR OPTIMIZING RESOURCE ALLOCATION IN A HOST-BASED REPLICATION ENVIRONMENT

(75) Inventors: Dov Bulka, Raleigh, NC (US); Neel Mehta, Morrisville, NC (US); Shon Boggs, Wake Forest, NC (US); Ken Collins, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 468 days.

(21) Appl. No.: 11/641,411

(22) Filed: Dec. 19, 2006

(51) Int. Cl.
*G06F 7/00* (2006.01)
(52) U.S. Cl. ..................... 707/633; 707/748
(58) Field of Classification Search ............... 707/633, 707/748
See application file for complete search history.

(56) References Cited

U.S. PATENT DOCUMENTS 5,963,944 A * 10/1999 Adams ..................... 707/10
6,928,459 B1 * 8/2005 Sawdon et al. ............. 707/205
2007/0027652 A1 * 2/2007 Hosagrahara .............. 702/182

* cited by examiner

*Primary Examiner*—James Trujillo
*Assistant Examiner*—Fatima P Mina
(74) *Attorney, Agent, or Firm*—Jenkins, Wilson, Taylor & Hunt, P.A.

(57) ABSTRACT

Methods, systems, and computer program products for optimizing resource allocation in a host-based replication environment are disclosed. According to one aspect, the subject matter described herein includes a method for optimizing resource allocation in a host-based replication environment. The method includes assigning a weight to each of a multiple of file system entities to be replicated. The method also includes creating a list of available transfer agents for replicating file system entities, the list having first and second ends and the list including at least one entry representing each transfer agent. The method also includes alternating between starting from the first end of the list and moving through the list until the second end of the list is reached and starting from the second end of the list and moving through the list until the first end of the list is reached, and, while moving through the list, assigning in order of weight each of the file system entities to the transfer agent represented by the current entry in the list.

20 Claims, 1 Drawing Sheet

METHODS, SYSTEMS, AND COMPUTER PROGRAM PRODUCTS FOR OPTIMIZING RESOURCE ALLOCATION IN A HOST-BASED REPLICATION ENVIRONMENT

TECHNICAL FIELD

The subject matter described herein relates to methods and systems for data replication. More particularly, the subject matter described herein relates to methods, systems, and computer program products for optimizing resource allocation in a host-based replication environment.

BACKGROUND

The explosion of digital content and its critical role in business processes has increased the need to protect sensitive data via data replication. Replication generally involves copying data from one location to another location, where the term "location" may mean a storage entity, a geographic location, a form of media, and so on. Replication may mean copying data from one storage entity to another within the same geographic location, for example. Replication may mean copying data from one geographic location to another geographic location. A transfer agent (TA) is an entity, typically a server, that performs the replication. In addition to making backup copies of data, another instance in which it may be desirable to replicate data from one storage location to another is referred to as cloning, where point in time copies are made of data in one location and stored in another location. Cloning is useful in applications where it is desirable to preserve snapshots of data at different times.

Regardless of the application, massive amounts of data being replicated may overwhelm the computing capacity of a single transfer agent. Typically, many transfer agents are required to complete the replication task. An even distribution of the replication load may minimize the time to complete the replication of a file server. It is a non-trivial problem to spread and allocate the work in a way that evenly distributes the burden among the available transfer agents.

Typical data replication environments may copy the contents of a source file server to a destination file server. A common methodology to replicate data between file servers is host-based replication, in which the transfer agent may be external to both source and destination file servers. The transfer agent reads data from the source file server and writes it to the destination file server. File servers are containers of potentially many file systems of varying complexity and characteristics. Given that a transfer agent has finite computational and file transfer capacity, a single transfer agent can replicate only a limited amount of data or number of files in a given window of time. As a result, it is often the case that a non-trivial replication of a file server may require many more than a single agent. Faced with the task of replicating data from one file server to another, one challenge is to make efficient use of the transfer agents that move the data from source to destination, and in particular to optimally distribute the work among the various transfer agents that are available.

Non-optimal allocation of the replication work may cause some agents to be overloaded while other agents are idle. As a result, time to completion may be longer, or more agents may be engaged, than are optimally necessary, both of which may translate into greater time or expense. For example, suppose there are 100 file systems to be copied between two file servers and that a simplistic allocation is used in which every transfer agent is responsible for replicating a single file system. It follows that 100 agents are needed to complete the replication task. If some file systems are large and others are small, using this methodology may result in some agents quickly completing their replication subtasks while others are still hard at work processing large file systems. It also follows that the overall replication of the entire file server is not complete until the last agent finishes the transfer of the most complex and largest file system. Although this method completes the replication task in reduced time, it requires many hardware resources and makes inefficient use of those resources. These inefficiencies are manifested in increased costs, since each transfer agent adds to the hardware and software cost of the whole solution.

In addition, the transfer agents may have unequal capabilities. Typically, transfer agents have hardware configurations that may differ in numerous ways, such as number of CPUs, CPU speed, memory size, bus speed, and so on.

Thus, given a set F of file system entities (f1, f2, f3, . . . ) and a set T of transfer agents (t1, t2, . . . ) there exists a need to map the set F to the set T such that the replication time of F is minimized.

SUMMARY

It is an object of the presently disclosed subject matter to provide methods, systems, and computer program products for optimizing resource allocation in a host-based replication environment.

As used herein, the term "file system entity" (FSE) refers to the basic entity to be replicated. Choice of the FSE will determine the atomicity of the data to be replicated. Possible FSEs include all or part of a file, directory, disk, partition, or file system.

As used herein, the term "weight" refers to a metric that is assigned to a file system entity and which represents a measure of relative difficulty, complexity, or resource requirement associated with the task of replicating a particular FSE. Some common metrics that may be factors used to determine the weight of a file system entity include the size of the file system entity, the number of files contained within the file system entity, the change rate and/or percentage change of the contents of the file system entity, or other metric, used singly or in combination.

As used herein, the term "rank" refers to the relative weight of one file system entity in comparison to the other file system entities. In other words, each FSE in a list of FSEs may be assigned a rank and the list itself may be sorted according to rank.

According to one aspect, the subject matter described herein includes a method for optimizing resource allocation in a host-based replication environment. The method includes assigning a weight to each of a multiple of file system entities to be replicated. The method also includes creating a list of available transfer agents for replicating file system entities, the list having first and second ends and the list including at least one entry representing each transfer agent. The method also includes alternating between starting from the first end of the list and moving through the list until the second end of the list is reached and starting from the second end of the list and moving through the list until the first end of the list is reached, and, while moving through the list, assigning in order of weight each of the file system entities to the transfer agent represented by the current entry in the list.

According to another aspect, the subject matter described herein includes a system for optimizing resource allocation in a host-based replication environment. The system includes multiple transfer agents for replicating multiple file system entities. The system also includes an assignment function for: assigning a weight to each of the plurality of file system entities to be replicated; creating a list of available transfer agents for replicating file system entities, the list having first and second ends and the list including at least one entry representing each transfer agent; alternating between starting from the first end of the list and moving through the list until the second end of the list is reached and starting from the second end of the list and moving through the list until the first end of the list is reached; and while moving through the list, assigning in order of weight each of the file system entities to the transfer agent represented by the current entry in the list.

The subject matter described herein for optimizing resource allocation in a host-based replication environment may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer program product comprising computer executable instructions embodied in a computer readable medium. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

Preferred embodiments of the subject matter described herein will now be explained with reference to the accompanying drawings of which.

DETAILED DESCRIPTION

In accordance with the subject matter disclosed herein, systems, methods, and computer program products are provided for optimizing resource allocation in a host-based replication environment.

Figure 1:
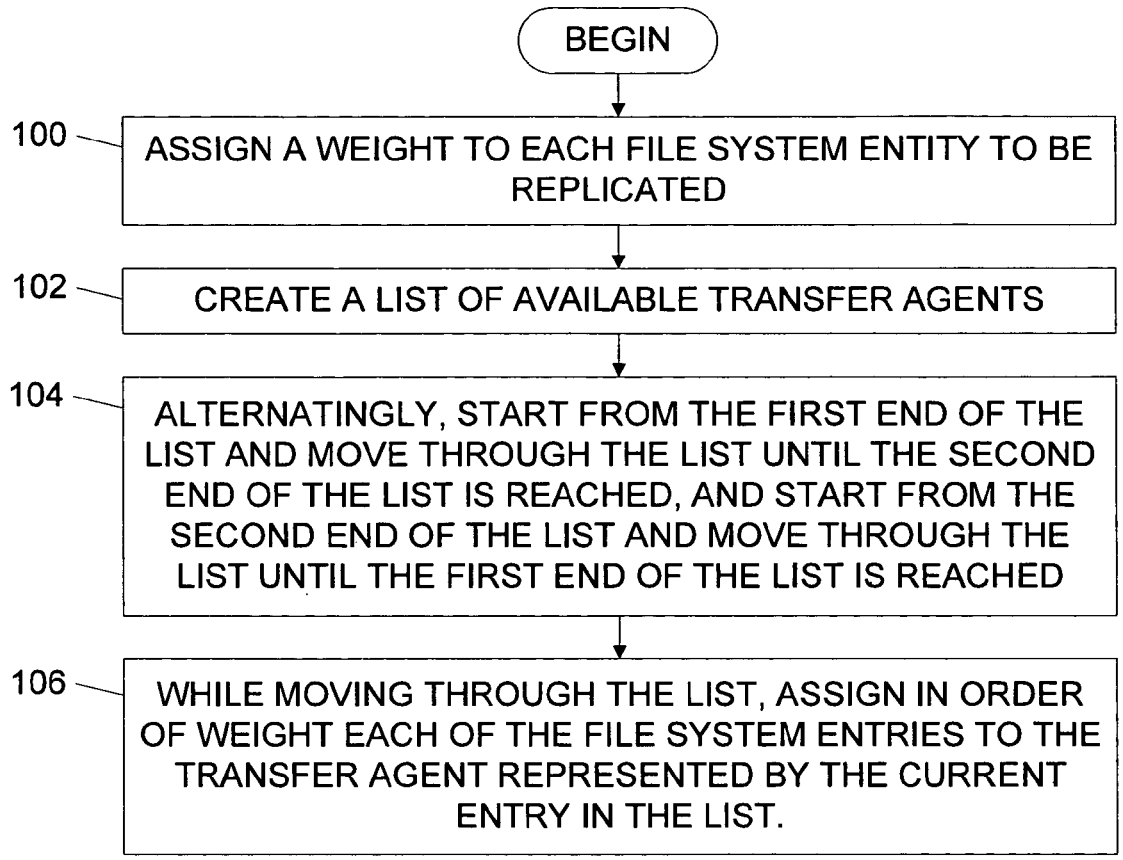
FIG. 1 is a flow chart illustrating an exemplary process for allocating resources for host-based replication of file system entities according to an embodiment of the subject matter described herein.

FIG. 1 is a flow chart illustrating an exemplary process for allocating resources for host-based replication of file system entities according to an embodiment of the subject matter described herein.

In step 100, given a set of file system entities, the file system entities are ranked by assigning weights based on a chosen metric, such as size of the file system entity in bytes, the number of files contained within the file system entity, the change rate and/or percentage change of the contents of the file system entity, or other metric, used singly or in combination. For example, let F be a set of file system entities $F=\{f_0, f_1, \ldots f_n\}$ and let W be a weighting function $W:F\rightarrow I$ where I is the set of positive integers. The function W assigns weights to the individual file system entities in F such that $W(f_0)$ is the weight assigned to file system entity $f_0$. Without loss of generality, the set of file system entities F can be arranged in such a way that the weights are sorted as in: $W(f_0) \leq W(f_1) \leq \ldots \leq W(f_n)$. In other words, the set of file system entities $F=\{f_0, f_1, \ldots f_n\}$ is ordered by its weighted metric. In this case, $f_0$ is the "lightest" file system entity while $f_n$ is the "heaviest" file system entity. Alternatively, the set of file system entities may be sorted from heaviest to lightest.

In step 102, a list of available transfer agents is created. Each transfer agent is represented by at least one entry in the list. For example, let T be the set of transfer agents $T=\{t_0, t_1, t_{m-1}\}$ where m is the number of transfer agents. Each transfer agent may be represented in the list of available transfer agents by a number of entries, where the number corresponds to the ratio of the agent's replication capability relative to the replication capability of the other agents.

Where one transfer agent, $t_0$, is the baseline, and the "power" of each of the other transfer agents is an integer multiple of the power of $t_0$, the following method may be used: first, given that there are three transfer agents, $t_0$, $t_1$ and $t_2$ where $t_1$ and $t_2$ are twice as powerful as $t_0$, create the multi-set T' in which the number of occurrences of a transfer agent is proportional to its computational power. In this example, $T'=\{t_0, t_1, t_1, t_2, t_2\}$. Second, map the multi-set T' onto set $S=\{s_0, s_1, s_2, s_3, s_4\}$ where the transfer agents have essentially been renamed such that:

$s_0$ corresponds to $t_0$
$s_1$ and $s_2$ correspond to $t_1$
$s_3$ and $s_4$ correspond to $t_2$ The set S can be viewed as a set of five equally powerful transfer agents.

This same methodology can be extended to situations where the relative computing power of one transfer agent is a non-integer multiple of the computing power of another transfer agent. Given transfer agent $t_0$ as the baseline, the powers of the all TAs in the set may be defined by establishing a common denominator to create the multi-set T'. For example, given the set $T=\{t_0, t_1, t_2\}$, and given that $t_1$ and $t_2$ are 1.5 times more powerful than $t_0$, the common denominator is 2, and the powers of $t_0$, $t_1$, $t_2$ are 2/2, 3/2, and 3/2, respectively. After multiplying by the common denominator 2, the powers of $t_0$, $t_1$, $t_2$ are 2, 3, and 3, respectively. Thus, the multi-set T' will contain two elements of the baseline $t_0$, three of $t_1$ and three of $t_2$: $T'=\{t_0, t_0, t_1, t_1, t_1, t_2, t_2, t_2\}$. For reasons that are explained in detail below, transfer agents' entries may be randomly or algorithmically distributed within the list, such as for example where $T'=\{t_1, t_2, t_0, t_2, t_1, t_0, t_2, t_1\}$.

In steps 104 and 106, the file system entities are assigned to transfer agents according to a file assignment function. According to one embodiment, the file assignment function may operate as follows: let A be an assignment function $A:F\rightarrow T$ such that $A(f_i)=t_j$ assigns the file system $f_i$ to a transfer agent denoted by $t_j$. For a given i (the index of a file system entity in the ordered set F) and m (the number of transfer agents available) there exist positive integers a and b such that $i=am+b$, where a and b are the quotient and remainder, respectively, of i divided by m. In other words, $a = i/m$     (where "/" is an integer division)
$b = i \% m$     (where "%" is the modulo function)

Table 1 below shows an example relationship of a, b, i, and m, where m=4 (i.e., there are four transfer agents available):

TABLE 1

Relationship of a, b, i, and m

| i | m | a | b |
|---|---|---|---|
| 0 | 4 | 0 | 0 |
| 1 | 4 | 0 | 1 |
| 2 | 4 | 0 | 2 |
| 3 | 4 | 0 | 3 |
| 4 | 4 | 1 | 0 |
| 5 | 4 | 1 | 1 |
| 6 | 4 | 1 | 2 |
| 7 | 4 | 1 | 3 |
| 8 | 4 | 2 | 0 |
| . | . | . | . |
| . | . | . | . |
| . | . | . | . |

The assignment function A is defined by the following expressions:

If a is odd, then $A(f_i)=t_b$

If a is even, then $A(f_i)=t_{(m-1-b)}$

Thus, in step 104, the assignment function selects the transfer agent to which the next file system entity is to be assigned by starting at the beginning of the TA list and stepping towards the end, and upon reaching the end, starting at the end of the TA list and stepping towards the beginning, repeating this back and forth motion through the list until all file system entities have been assigned. In step 106, while moving back and forth through the list, the file system entities are allocated to the transfer agent represented by the current entry in the TA list. For example, where F represents a set of nine file system entities and T represents a set of three transfer agents:

$F=\{f_0, f_1, f_2, f_3, f_4, f_5, f_6, f_7, f_8\}$ $T=\{t_0, t_1, t_2\}$ the function A will assign file system to transfer agents as shown in Table 2, below:

TABLE 2

Assignment Function Example 1

| i | m | a | b | $A(f_i) = t_b$ | $A(f_i) = t_{(m-1-b)}$ | a:odd or even? | output of $A(f_i)$ |
|---|---|---|---|---|---|---|---|
| 0 | 3 | 0 | 0 | 0 | 2 | odd | 0 |
| 1 | 3 | 0 | 1 | 1 | 1 | odd | 1 |
| 2 | 3 | 0 | 2 | 2 | 0 | odd | 2 |
| 3 | 3 | 1 | 0 | 0 | 2 | even | 2 |
| 4 | 3 | 1 | 1 | 1 | 1 | even | 1 |
| 5 | 3 | 1 | 2 | 2 | 0 | even | 0 |
| 6 | 3 | 2 | 0 | 0 | 2 | odd | 0 |
| 7 | 3 | 2 | 1 | 1 | 1 | odd | 1 |
| 8 | 3 | 2 | 2 | 2 | 0 | odd | 2 |

This result of the assignment function is displayed graphically in Table 3, below:

TABLE 3

Result of Assignment Function Example 1

| $f_0$ | $f_1$ | $f_2$ |
|---|---|---|
| $f_5$ | $f_4$ | $f_3$ |
| $f_6$ | $f_7$ | $f_8$ |
| $t_0$ | $t_1$ | $t_2$ |

It can be seen that file system entities $f_0$, $f_5$ and $f_6$ are assigned to transfer agent $t_0$; $f_1$, $f_4$ and $f_7$ are assigned to transfer agent $t_1$; and $f_2$, $f_3$ and $f_8$ are assigned to transfer agent $t_3$.

In embodiments where the relative capabilities of the transfer agents may be taken into account, the set of transfer agents may, for example look like this: $T'=\{t_0, t_1, t_1, t_2, t_2, t_2, t_2\}$, where transfer agent $t_1$ has two times the replication capability of $t_0$ and transfer agent $t_2$ has four times the replication capability of transfer agent $t_0$. In this example, the result of the assignment function may be:

TABLE 4

Assignment Function Example 2 - undistributed

| $f_0$ | $f_1$ | $f_2$ | $f_3$ | $f_4$ | $f_5$ | $f_6$ |
|---|---|---|---|---|---|---|
|  |  |  | $f_{10}$ | $f_9$ | $f_8$ | $f_7$ |
| $t_0$ | $t_1$ | $t_1$ | $t_2$ | $t_2$ | $t_2$ | $t_2$ |

In Table 4, above, it can be seen that if the list of files is sorted from lightest to heaviest, transfer agent $t_2$ may receive a disproportionately heavy load, even considering its increased capability. This possible problem may be mitigated by randomly or algorithmically distributing the transfer agent's entries within the list T', such as in Table 5, below:

TABLE 5

Assignment Function Example 2 - distributed

| $f_0$ | $f_1$ | $f_2$ | $f_3$ | $f_4$ | $f_5$ | $f_6$ |
|---|---|---|---|---|---|---|
|  |  |  | $f_{10}$ | $f_9$ | $f_8$ | $f_7$ |
| $t_2$ | $t_2$ | $t_1$ | $t_0$ | $t_2$ | $t_2$ | $t_1$ |

Here, it can be seen that the larger files are more evenly distributed across the transfer agents.

Figure 2:
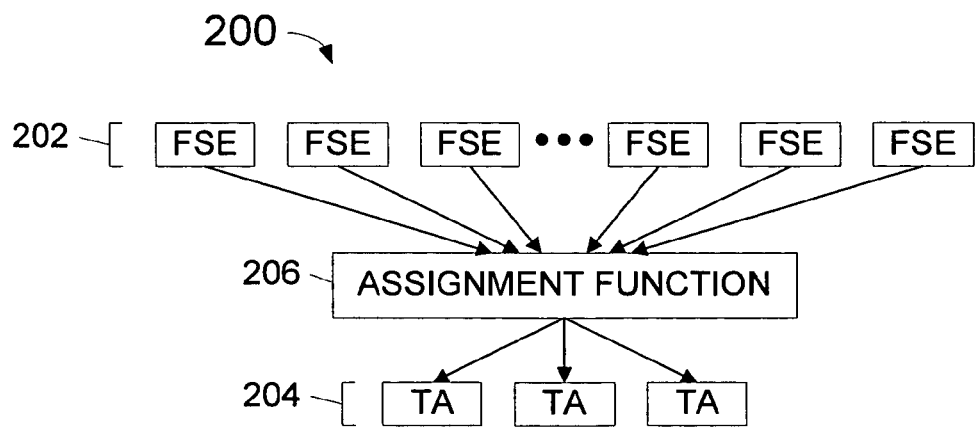
FIG. 2 is a block diagram illustrating a system for optimizing resource allocation in a host-based replication environment according to an embodiment of the subject matter described herein.

FIG. 2 is a block diagram illustrating a system for optimizing resource allocation in a host-based replication environment according to an embodiment of the subject matter described herein. System 200 may include at least one FSE 202 to be replicated and may include more than one TA 204. For example, as described above, file system entities 202 may be files systems maintained by file servers, and transfer agent 204 may be any combination of hardware, software, or firmware for copying file systems between file servers. System 200 includes an assignment function 206 for assigning a weight to each FSE 202 to be replicated, for creating a list of available TAs for replicating file system entities, and for assigning each FSE 202 a TA 204. For example, assignment function 206 may be software that executes on a supervisory platform for assigning transfer agents to file system entities to be copied. Assignment function 206 may operate according to an embodiment described hereinabove, in which assignment function 206 alternately moves back and forth through the list of TAs as it assigns each of the FSEs in order of weight to the next TA in the list.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for optimizing resource allocation in a host-based replication environment, the method comprising:

(a) assigning a weight to each of a plurality of file system entities, located on at least one storage device, to be replicated;

(b) creating a list of available transfer agents for replicating file system entities, the list having first and second ends and the list including at least one entry representing each transfer agent;
(c) alternatingly:
  (i) starting from the first end of the list and moving through the list until the second end of the list is reached; and
  (ii) starting from the second end of the list and moving through the list until the first end of the list is reached;
(d) while moving through the list, assigning in order of weight each of the file system entities to the transfer agent represented by the current entry in the list; and
(e) replicating the file system entities, where each file system entity is replicated by the transfer agent to which it was assigned.

2. The method of claim 1 wherein assigning the weight includes calculating the weight based at least in part upon the size of each file system entity to be replicated.

3. The method of claim 1 wherein assigning the weight includes calculating the weight based at least in part upon the number of files in each file system entity to be replicated.

4. The method of claim 1 wherein assigning the weight includes calculating the weight based at least in part upon the rate of change of each file system entity to be replicated.

5. The method of claim 1 wherein each transfer agent is represented in the list of available transfer agents by a number of entries, the number corresponding to the ratio of the agent's replication capability relative to the replication capability of the other transfer agents.

6. The method of claim 5 wherein each transfer agents' entries are randomly distributed within the list.

7. The method of claim 5 wherein each transfer agents' entries are algorithmically distributed within the list.

8. A system for optimizing resource allocation in a host-based replication environment, the system comprising:
(a) a plurality of transfer agents for replicating a plurality of file system entities located on at least one storage device; and
(b) an assignment device for:
  assigning a weight to each of the file system entities to be replicated;
  creating a list of available transfer agents for replicating file system entities, the list having first and second ends and the list including at least one entry representing each transfer agent;
  alternatingly:
  (i) starting from the first end of the list and moving through the list until the second end of the list is reached; and
  (ii) starting from the second end of the list and moving through the list until the first end of the list is reached; and
  while moving through the list, assigning in order of weight each of the file system entities to the transfer agent represented by the current entry in the list, wherein the file system entities are each replicated by the transfer agent to which the file system entity was assigned.

9. The system of claim 8 wherein, in assigning each weight, the assignment device is adapted to calculate the weight based at least in part upon the size of each file system entity to be replicated.

10. The system of claim 8 wherein, in assigning each weight, the assignment device is adapted to calculate the weight based at least in part upon the number of files in each file system entity to be replicated.

11. The system of claim 8 wherein, in assigning each weight, the assignment device is adapted to calculate the weight based at least in part upon the rate of change of each file system entity to be replicated.

12. The system of claim 8 wherein the assignment device is adapted to represent each transfer agent in the list of available transfer agents by a number of entries, the number corresponding to the ratio of the agent's replication capability relative to the replication capability of the other agents.

13. The system of claim 8 wherein the assignment device is adapted to randomly distribute each transfer agents' entries in the list.

14. The system of claim 8 wherein the assignment device is adapted to algorithmically distribute each transfer agents' entries in the list.

15. A computer program product comprising computer executable instructions embodied in a computer readable medium for performing steps comprising:
(a) assigning a weight to each of a plurality of file system entities, located on at least one storage device, to be replicated;
(b) creating a list of available transfer agents for replicating file system entities, the list having first and second ends and the list including at least one entry representing each transfer agent;
(c) alternatingly:
  (i) starting from the first end of the list and moving through the list until the second end of the list is reached; and
  (ii) starting from the second end of the list and moving through the list until the first end of the list is reached; and
(d) while moving through the list, assigning in order of weight each of the file system entities to the transfer agent represented by the current entry in the list, wherein the file system entities are each replicated by the transfer agent to which the file system entity was assigned.

16. The computer program product of claim 15 wherein assigning the weight includes calculating the weight based at least in part upon the size of each file system entity to be replicated.

17. The computer program product of claim 15 wherein assigning the weight includes calculating the weight based at least in part upon the number of files in each file system entity to be replicated.

18. The computer program product of claim 15 wherein each transfer agent is represented in the list of available transfer agents by a number of entries, the number corresponding to the ratio of the agent's replication capability relative to the replication capability of the other transfer agents.

19. The computer program product of claim 18 wherein each transfer agents' entries are randomly distributed within the list.

20. The computer program product of claim 18 wherein each transfer agents' entries are algorithmically distributed within the list.

* * * * *